(12) United States Patent
Pilsl et al.

(10) Patent No.: US 8,325,373 B2
(45) Date of Patent: Dec. 4, 2012

(54) PRINTING SYSTEM WITH MULTIPLE DATA BUS SEGMENTS

(75) Inventors: Stephan Pilsl, Roehrmoos (DE); Martin Pappenberger, Tuntenhausen (DE); Arno Best, Unterschleissheim (DE)

(73) Assignee: Océ Printing Systems GmbH, Poing (DE)

( * ) Notice: Subject to any disclaimer, the term of this patent is extended or adjusted under 35 U.S.C. 154(b) by 0 days.

(21) Appl. No.: 13/357,125

(22) Filed: Jan. 24, 2012

(65) Prior Publication Data

US 2012/0188603 A1 Jul. 26, 2012

(30) Foreign Application Priority Data

Jan. 24, 2011 (DE) .................... 10 2011 000 297

(51) Int. Cl.
*G06F 3/12* (2006.01)
*G06F 13/00* (2006.01)
*G06F 13/36* (2006.01)

(52) U.S. Cl. ....... 358/1.15; 710/100; 710/107; 710/110; 710/300; 710/306

(58) Field of Classification Search ................. 358/1.15; 710/300, 107, 110, 306, 100
See application file for complete search history.

(56) References Cited

U.S. PATENT DOCUMENTS

| 5,034,878 | A | 7/1991 | Haapala et al. |
| 6,151,298 | A | 11/2000 | Bernhardsson et al. |
| 6,865,460 | B2 | 3/2005 | Bray et al. |
| 7,541,830 | B2 | 6/2009 | Fahrbach et al. |
| 2003/0131159 | A1 | 7/2003 | Gregory et al. |
| 2004/0263903 | A1 | 12/2004 | Oikawa |
| 2009/0185215 | A1 | 7/2009 | Kreppold et al. |

FOREIGN PATENT DOCUMENTS

| WO | 02056545 A2 | 7/2002 |
| WO | 2004062219 A1 | 7/2004 |
| WO | 2007122229 A2 | 11/2007 |

*Primary Examiner* — Twyler Haskins
*Assistant Examiner* — Fred Guillermety
(74) *Attorney, Agent, or Firm* — Schiff Hardin LLP

(57) ABSTRACT

In a printing system or method, two printing units apply printing ink onto a recording material, each printing unit having multiple apparatuses with a respective microprocessor controller. The microprocessor controllers are connected with one another via a respective data bus segment and each data bus segment has multiple data lines. The two data bus segments of the two printing units are connected with a bus switch. The bus switch has a data switch to connect a respective one of the lines of the one data bus segment with the corresponding line of the other data bus segment, a respective terminating resistor being provided for each data bus segment. The terminating resistors are connected with a respective terminating switch coupled with the data switches such that either all terminating switches are open and all data switches are closed, or all terminating switches are closed and all data switches are open.

10 Claims, 3 Drawing Sheets

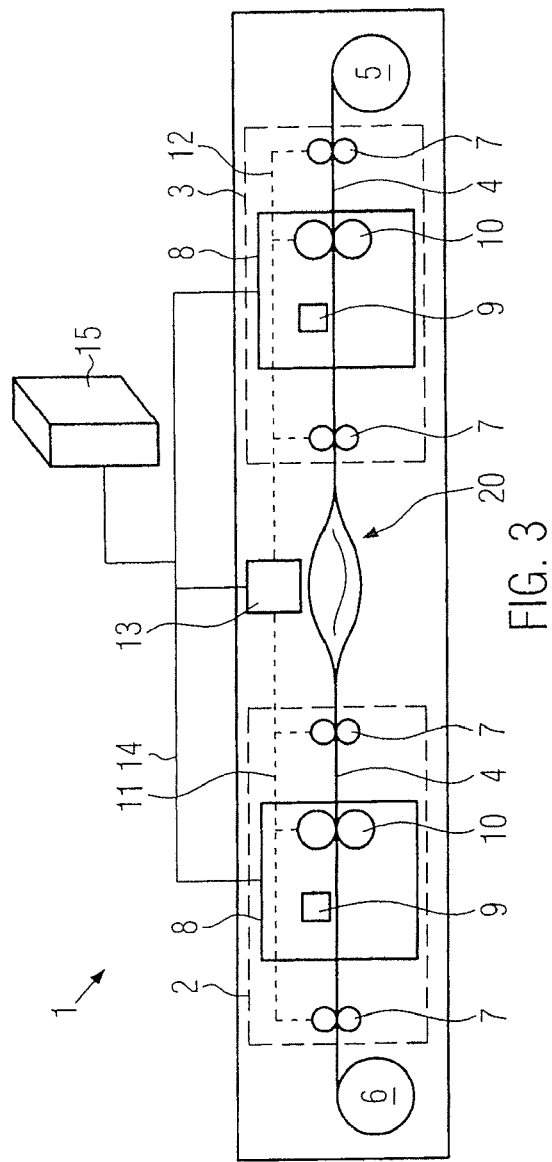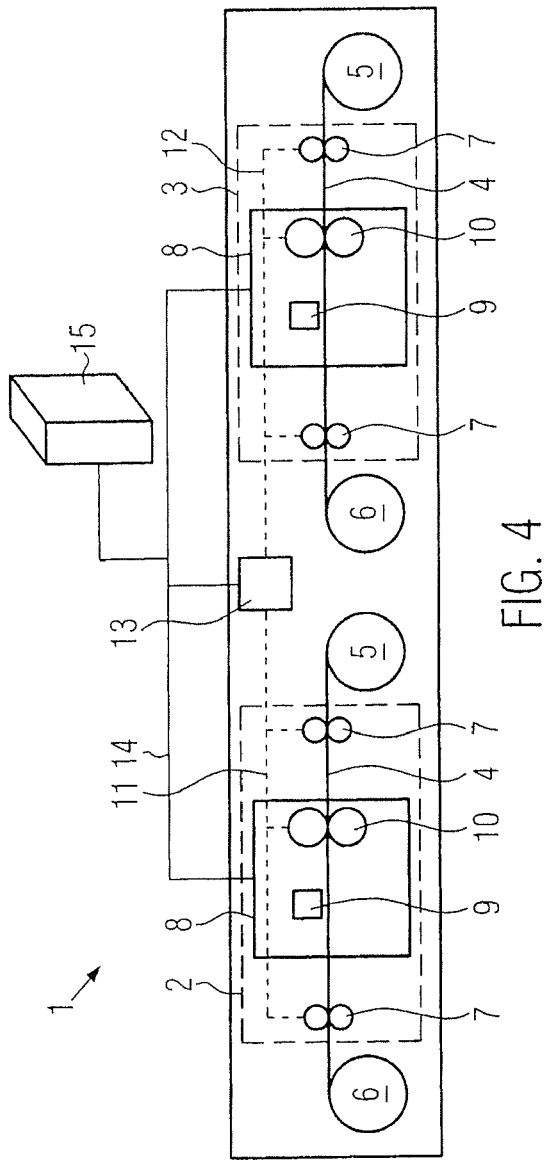

PRINTING SYSTEM WITH MULTIPLE DATA BUS SEGMENTS

RELATED APPLICATION

The present application is related to co-pending application case number P11,0344 filed Jan. 24, 2011 titled "Tandem Printing System and Method to Control a Tandem Printing System, and Computer System, and Computer Program Product", inventors Boeck et al.

BACKGROUND

The disclosure concerns a printing system. In particular, the disclosure concerns a printing system that has at least two printing units to apply printing ink onto a recording material, wherein each printing unit has multiple apparatuses with a respective microprocessor controller, wherein the microprocessor controllers of one printing unit are connected with one another with a respective data bus.

A typical data bus to control apparatuses is the CAN bus. The abbreviation CAN stands for Controller Area Network. Individual bus participants (which are electrical modules or structural assemblies) of an apparatus (for example a printing device) are connected with one another with the CAN bus. The CAN bus is a simpler, more cost-effective, serial data bus with which data can in fact be transferred very simply but with a relatively low transfer rate within the scope of microprocessors. According to the CAN protocol, to transmit data the data are distributed in multiple telegrams, wherein each telegram comprises a data block and an identifier.

The CAN bus or the corresponding protocol is explained in detail in "CAN—Controller Area Network, Grundlagen and Praxis", W. Lawrenz (Ed.), 2nd edition, 1997 (ISBN 3-7785-2575-1) on Pages 86 through 95. A CAN bus is typically realized with a differential electrical two-wire conductor. A CAN data telegram can comprise a start bit; an identifier comprising 11 bits; 7 additional control bits; 0 to 8 data bytes; and additional control bits that follow the data bytes. The structure of a CAN data telegram can differ depending on the version of the CAN specification.

The arbitration is executed per bit and without control. This means that the sender (which takes precedence relative to other senders in the data bus due to its priority) does not need to resend its telegram. For arbitration, the control bits provided by the data bytes are used, wherein the arbitration essentially takes place via the bits of the identifier. From "Associate Identifier and Exchange Messages", (ISBN 3-8259-1902-1) 1st edition, 1998, PRAXIS Profiline—Controller Area Network (CAN), Pages 40 to 43, it arises that the type of the identifier specification can be designated as a fundamental structural element of CAN-based systems since the identifier defines a CAN message, its relative priority and thus its latency time. Moreover, the scheme of the association of identifiers with CAN messages ultimately determines the communication structure of the network.

In what is known as a CANopen network, an apparatus-oriented allocation scheme for identifiers which enables a data exchange between a superordinate control apparatus (master) with up to 127 slave apparatuses is provided with what is known as a "minimal apparatus configuration". The maximum number of participants in such a CANopen network is 128. This number of participants is limited by the 11-bit identifier.

In Zeltwanger, Holger "Everyone Can Send and All Receive: CAN Communication and Bus Arbitration", (ISBN 3-8251-1902-1) 1st edition, 1998, Praxis Profiline—Controller Area Network (CAN), Pages 5-7, the difference between the data telegrams with standard frames that have the 11-bit identifier and with the extended frames that have the 29-bit identifier is explained in detail.

A device for a conductor termination of 2-wire conductors, in particular for a CAN bus system, arises from WO 2004/062219 A1. This device has a first and second terminating resistor between the two wires of the data line, wherein the first and second terminating resistor are connected in series. Switches that are activated by a control logic are provided between the two terminating resistors. The control logic is connected with a microcontroller so that, after receiving a corresponding signal from the microcontroller, the control logic can operate the switches arranged between the terminating resistors. The configuration of the terminating resistor can thus be changed at any time with the microcontroller. Alternatively, an adaptation of the terminating resistor in hardware is provided by means of a bridge in the cable harness plug.

A branching device for a data bus (a CAN bus, for example) arises from WO 02/056545 A2. Individual branches can be uncoupled or coupled in a star bus topology with this branching device. This is possible during the operation of the data bus. This branching device has an interface converter, a transmission and reception unit and one or more terminating resistors.

A method to connect bus participants to an existing CAN bus is known from WO 2007/122229 A2. In this method, upon connecting new bus participants preliminary participant identification numbers are determined using the serial numbers of the respective bus participant; these are used as identifiers for bus messages with which the allocation of final participant identification numbers is executed. The final participant identification numbers are shorter than the serial numbers, which is why it is possible in the ultimate operation to use bus messages with correspondingly short identifiers.

A data bus system is presently considered that is designed such that, solely via the connection of a new bus participant with a bus cable to an existing data bus, the data bus is automatically terminated with the correct characteristic impedance.

Complex apparatuses (high-capacity printers, for example) are most often modular in design. It should hereby be possible to add or remove individual modules or structural groups as simply as possible. These modules and structural groups should hereby also be coupled to or decoupled from a data bus that is possibly present.

From U.S. Pat. No. 6,865,460 B2, a "segmented" CAN bus arises in which an address is associated with each individual node so that the bus topology can automatically be detected. The nodes thus must be provided with electronic structural elements which can store the addresses and from which the addresses can be polled.

What are known as CAN repeater switching elements are distributed by the company IXXAT Inc., 120 Bedford Center Road, Bedford, N.H. 03110, USA., www.ixxat.com, for example under the commercial name "CAN-CR200 Modular ISO 11898-2 CAN Repeater"; see for example www.ixxat.com/can_cr200_en.druck, downloaded by the applicant on 19 Jan. 2011.

These are switching elements to connect CAN buses with which data can be transferred across CAN busses that are physically separate in design. These switching elements electrically decouple the individual CAN buses, wherein they logically link them with one another, however. However, what is disadvantageous with such switching elements is that they decrease the maximum data transfer rate that is possible in a CAN bus. Given applications in which a data bus should be used with the maximum possible data transfer rate, such switching elements are unsuitable. In high-capacity printing systems, due to the plurality of apparatuses to be connected high data transfer rates are necessary, such that the use of conventional switching elements often appears to be unwise.

In the related U.S. Patent Application case no. P11,0344 filed Jan. 24, 2011 and the title "Tandem Printing System and Method to Control a Tandem Printing System, and Computer System, and Computer Program Product" that was submitted by the applicant at the same time as this Application, a tandem printing system is described whose two printing apparatuses are selectively operable individually or jointly. For this, at least one of the printing apparatuses has an activation operating unit with which at least one of the printing apparatuses can be selectively activated for its individual operation or both printing apparatuses can be activated for the tandem operation.

The aforementioned disclosures or the contents of the Patent Applications are herewith incorporated by reference into the present Specification.

A printing system with a CAN bus to which multiple apparatuses can optionally be connected is known from US 2003/0131159 A1. After the connection the terminating resistor is respectively reset by means of a controller.

Multifunction printing apparatuses with a respective scan device that can be operated in a tandem mode and for this are connected with one another via an IEEE13941 network are known from US 2004/0263903 A1. If the tandem mode is selected in a control panel by a user, controllers of the respective participating apparatuses are then set accordingly.

A method to configure a CAN bus system is known from U.S. Pat. No. 5,034,878 A.

A CAN bus system that is subdivided into multiple sections is known from U.S. Pat. No. 6,151,298 A. The sections can be connected with one another via connection circuits.

SUMMARY

It is an object to specify a printing system with at least two printing units to apply printing ink onto a recording material, wherein each printing unit has multiple apparatuses with a respective microprocessor controller, and the microprocessor controllers of a printing unit are connected with one another via a respective data bus, and the printing system additionally such that the printing units can be operated both jointly and independently of one another.

In a printing system, or method for the printing system, at least two printing units apply printing ink onto a recording material, each printing unit having multiple apparatuses with a respective microprocessor controller. The microprocessor controllers are connected with one another via a respective data bus segment and wherein each data bus segment has multiple data lines. The two data bus segments of the two printing units are connected with a bus switch. The bus switch has a data switch to connect a respective one of the lines of the one data bus segment with the corresponding line of the other data bus segment, a respective terminating resistor being provided for each data bus segment. The terminating resistors are connected in series with a respective terminating switch coupled with the data switches such that either all terminating switches are open and all data switches are closed, or all terminating switches are closed and all data switches are open.

BRIEF DESCRIPTION OF THE DRAWINGS

FIG. 3 shows a printing system with two printing units that is operated as a duplex system; and FIG. 4 illustrates the printing system from FIG. 3, wherein the two printing units are respectively operated as simplex systems.

DESCRIPTION OF EXEMPLARY PREFERRED EMBODIMENT

Figure 1:
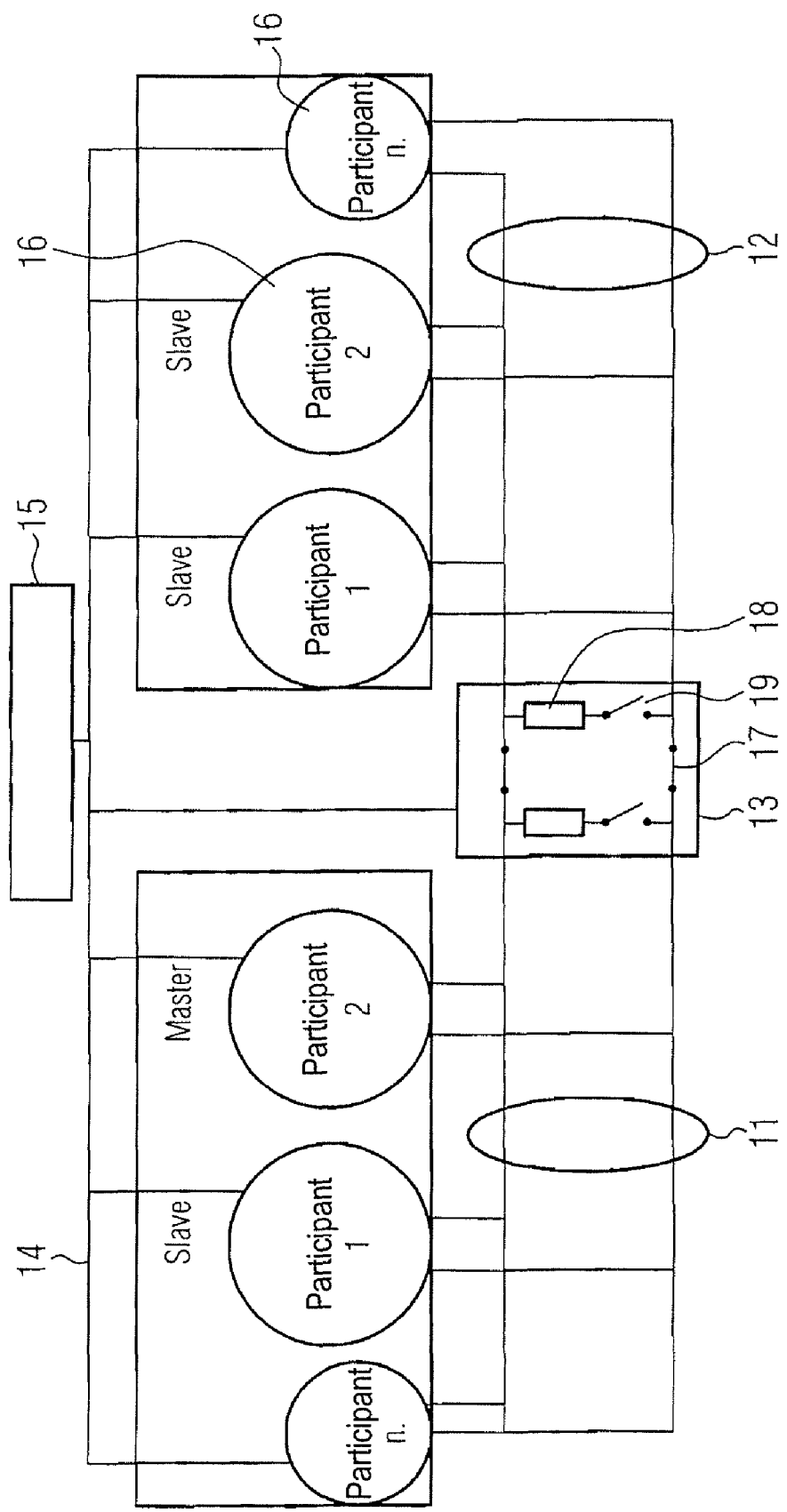
FIG. 1 shows multiple apparatuses of a respective printing unit that are connected with a respective data bus segment, wherein the data bus segments are connected into a joint data bus.

For the purposes of promoting an understanding of the principles of the invention, reference will now be made to the preferred exemplary embodiment/best mode illustrated in the drawings and specific language will be used to describe the same. It will nevertheless be understood that no limitation of the scope of the invention is thereby intended, and such alterations and further modifications in the illustrated embodiment and such further applications of the principles of the invention as illustrated as would normally occur to one skilled in the art to which the invention relates are included.

The printing system according to the preferred embodiment comprises at least two printing units to apply printing ink onto a recording material. Each printing unit has multiple apparatuses with a respective microprocessor controller, wherein the microprocessor controllers of a printing unit are connected unit with one another via a respective data bus segment. Each data bus segment has multiple data lines. The at least two data bus segments of the two printing units are connected with one another via a bus switch. For each data line the bus switch has a respective data switch to connect a respective data line of the one data bus segment with the corresponding data line of the other data bus segment, and a respective terminating resistor for each data bus segment, wherein the terminating resistors are connected in series with a respective terminating switch, and the terminating switches are coupled with the data switches such that either all terminating switches are open and all data switches are closed or all terminating switches are closed and all data switches are open.

Since the bus switch has data switches to connect a respective data line of the one data bus segment with the corresponding data line of the other data bus segment, according to the exemplary embodiment the data bus segments disconnected given opened data switches are linked to a common data bus. It is hereby ensured that the maximum transfer rate that is possible with the respective data bus type can also be achieved in the printing system according to the exemplary preferred embodiment.

Upon opening the data switches, the terminating switches are closed so that the data bus segments disconnected by the data switches are correctly terminated by means of the corresponding terminating resistors and can be operated as separate data buses. A correct operation with the disconnected data bus segments is also hereby ensured.

The data switches are advantageously mechanical switches, in particular relays, such that the data lines of the two data bus segments are "physically" connected with one another when the data switches are closed.

The printing system according to the embodiment can thus be operated such that the two data bus segments respectively form a separate data bus, whereby the two printing units can be activated completely independently of one another. It is also possible to operate the printing system according to the embodiment such that the two data bus segments form a common data bus, and such that the two printing units are activated simultaneously via the common data bus in order to be operated jointly. The latter is appropriate when the two printing units are used to print the same recording material, in particular a recording material web, wherein the one printing unit is used to print the front side of the recording material and the other printing unit is used to print the back side of the recording material, for example.

The printing system is advantageously designed so that the apparatuses provided with the microprocessors serve to drive the recording material in the printing system. It can thereby be provided in particular that the apparatus that determines the transport speed of the recording material have the microprocessor controller that is initialized as a master. Via the data bus this master microprocessor system then provides the speed with which the other apparatuses have to convey the recording material(s). The microprocessor controller initialized as master (which is designed as master in the following) generates a message containing the speed value that is transmitted via the data bus to the additional microprocessor controller. This is a broadcast message, meaning that this message can be read on the data bus of all connected microprocessor apparatuses. The master can hereby ensure the correct speed setting in the printing system with a single message. This similarly applies whether the two printing units with their data bus segments are operated independently of one another, or whether they are operated as a unit in that the two data bus segments are connected into a common data bus.

The data bus is advantageously designed as a two wire bus and is in particular operated serially. It is advantageously operated with a CAN protocol. However, within the scope of the exemplary embodiment it is also possible to provide a different protocol, for example an HSCX protocol.

The printing system advantageously has a central control device that, among other things, activates the data switch and the terminating switch to open and close them.

The central control device is advantageously connected with the microprocessor controllers and is designed such that all data bus segments are correctly configured upon activation of the printing system and/or upon switching the bus switch. Via the automatic configuration upon switching over the bus switch, it can be ensured that the microprocessor controllers are initialized correctly, meaning that only a single microprocessor controller in the entire data bus is initialized as a master and the remaining microprocessor controllers are initialized as slaves.

The central control device is advantageously connected with the microprocessor controllers via a separate—in particular parallel—bus system. The initialization of the microprocessor controllers can then take place via the separate bus system.

By means of the central control device, the printing system can then be switched centrally between the joint operation of the two printing units and the separate operation of the two printing units. The joint operation is also designated as a "duplex system" and the separate operation is designated as a "simplex system".

The preferred embodiment is subsequently explained in detail as an example using the drawings.

A printing system 1 (FIGS. 3, 4) comprises two printing units 2, 3. The printing units 2, 3 have a transport path 4 to convey the recording material or recording materials. If the printing units 2, 3 are designed to print single pages, multiple individual sheets of pages are transported on the transport path 4. However, the transport path 4 can also be designed to print a continuous or web-shaped recording material that, for example, is drawn from an input roller 5, is conveyed along the transport path, and is rolled up on an output roller 6. Roller pairs 7 that are respectively driven by a motor (not shown) in order to convey the recording material with a predetermined speed are arranged along the transport path 4. Each printing unit 2, 3 has a print assembly 8 in which a print head 9 is arranged to apply the ink onto the recording material. In the present exemplary embodiment, the print head is an inkjet print head. However, the print head 9 can also be a print head with a different printing method, for example for electrophotographic printing of toner or for a thermoprinting on the recording material. The print assemblies 8 respectively have a roller pair 10 that is also driven by a motor in order to supply the print head 9 to the recording material with a prescribed speed. The speed of the recording material with which this is moved along the print head 9 determines the pitch of the pixels generated on the print head 9 on the recording material in the transport direction.

All roller pairs 7, 10 are respectively connected with a microprocessor controller 16 (FIG. 1, 2) that controls the rotation speed of the roller pairs 7, 10. The corresponding microprocessor controllers of a respective one of the two printing units 2, 3 are connected with one another with a data bus segment 11, 12. The two data bus segments 11, 12 are connected with one another with a bus switch 13.

With the bus switch 13, the two data bus segments 11, 12 can be separated so that they are operated as two separate data buses, or so they can also be connected with one another with the bus switch 13 such that the two data bus segments 11, 12 are operated as a common data bus.

The decision as to whether the data bus segments 11, 12 are separated depends on whether the printing units 2, 3 should be operated as simplex systems or as a duplex system. This decision can in particular take place in the course of the activation by one of the printing units (printing apparatuses) 2, 3. For this it is advantageous to provide an activation operating unit in at least one of the printing apparatuses 2, 3, via which activation operating unit at least one of the two printing apparatuses can be selectively activated for the simplex mode or both printing apparatuses can be activated for the duplex mode (which can also be designated as tandem mode). Such an activation operating unit and additional details are described in the aforementioned U.S. Patent Application (submitted simultaneously by the applicant with this Application) with the applicant's case number P11,0344 and the title "Tandem Printing System and Method to Control a Tandem Printing System, and Computer System, and Computer Program Product". The content of this Patent Application is therefore referenced again at this point.

The data bus segments 11, 12 are advantageously designed as a serial data bus, in particular as a serial data bus with differential data transfer, wherein two physical conductors on which the data signal or an inverse data signal are present are provided for each data line of the data bus in order to be able to eliminate interference signals injected at the same phase. In the present exemplary embodiment, the data bus is designed as a CAN data bus.

The printing system 1 additionally has a parallel bus system 14 to which all microprocessor controllers are connected. The parallel bus system 14 is also connected with a central control device 15. The bus switch 13 is connected to the parallel bus system 14 such that it can be activated by the central control device 15 to open or close.

Figure 2:
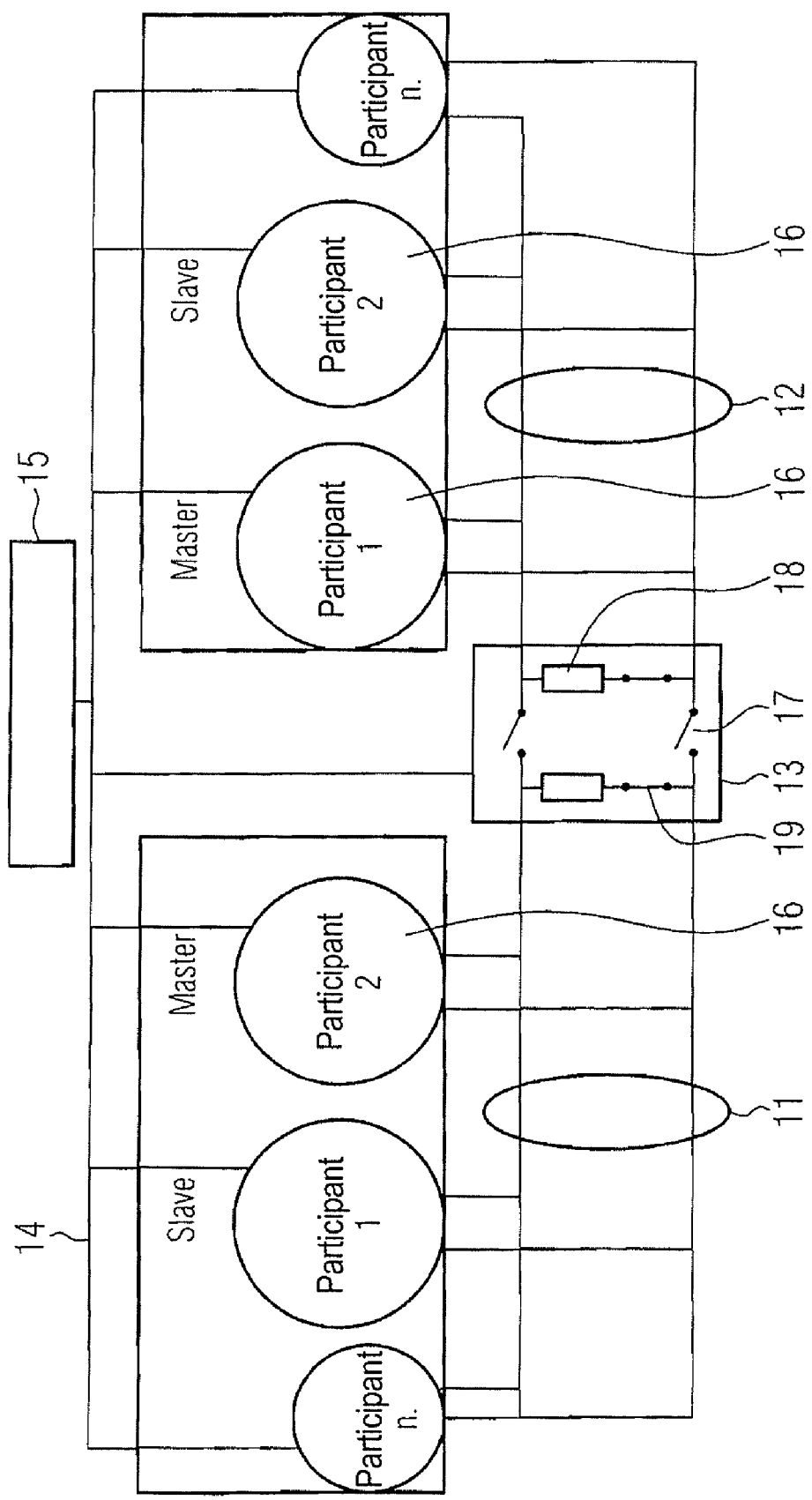
FIG. 2 illustrates multiple apparatuses of a respective printing unit that are connected with a respective data bus segment, wherein the data bus segments are connected as separate data buses.

FIG. 1 and FIG. 2 schematically show a simplification of the data bus segments 11, 12, the bus switch 13, the microprocessor controllers 16 and the parallel bus system 14 with the central control device 15.

The data bus segments 11, 12 respectively have two conductors for differential transfer of the serial data signals. They are connected with all microprocessor controllers 16 and the bus switch 13.

The bus switch 13 has two data switches 17 that respectively connect a data line of the one data bus segment 11 with one of the data lines of the other bus segment 12. A terminating resistor 18 and a terminating switch 19 are respectively connected in series between the end regions of the respective data bus segments 11, 12. If the respective terminating switch 19 is connected, the corresponding terminating resistor 18 is thus connected in an electrically conductive manner with the two conductors of the respective data bus segment 11, 12.

The terminating switches 19 are coupled with the data switches 17 of the bus switch 13 such that either all terminating switches 19 are opened and all data switches 17 are closed, or all terminating switches 19 are closed and all data switches 17 are opened. It is hereby ensured that, when the data switches 17 are open, the two data bus segments 11, 12 are properly terminated. Otherwise, when the data switches 17 are closed, it is ensured that the connection to the terminating resistors 18 is interrupted so that the two data bus segments 11, 12 form a continuous data bus without interfering resistors.

FIG. 1 shows the bus switch 13 with closed data switches 17 and open terminating switches 19. FIG. 2 shows the bus switch 13 with open data switches 17 and closed terminating switches 19.

In a serial data bus—in particular in the CAN bus—one bus participant must be initialized as a master that controls the data bus, and the remaining bus participants must be initialized as slaves that are subordinate to the control of the master on the data bus. In the present exemplary embodiment, the bus participants are the microprocessor controllers 16. Upon activation of the printing system 1 or upon switching the bus switch 13, all bus participants are reconfigured. Before starting up the individual bus participants, the central control device 15 initializes the individual bus participants via the parallel bus system 14 as to whether they are booted as master or as slave.

If both data bus segments 11, 12 are connected with one another with the bus switch 13 (FIG. 1), one of the bus participants is initialized as master in only one of the two printing units 2, 3. If the two data bus segments 11, 12 are separated by the bus switch 13 (FIG. 2), one bus participant is respectively initialized as a master in both printing units 2, 3, and the two data bus segments 11, 12 are operated as separate data buses.

In the respective data bus, the master controls the transport speed in that it places a corresponding message on the data bus, which message contains a value representing the speed. This message is read by all bus participants connected with the data bus, which participants thus adjust the speed at the respective apparatus components (for example the roller pairs 7).

The master can also define the position of the recording material relative to the additional bus participants (slaves), for example in that it feeds a message with its rotation position at the beginning of the transport process onto the data bus, which message is read by all slaves. If the transport process is started, the master then generates a synchronization signal that is also fed into the data bus and recognized by the slaves. The information of with what speed the flow of the recording material or recording materials move and at which point the recording material is located is hereby present in all bus participants.

FIG. 3 shows the printing system, wherein the two printing units 2, 3 are operated jointly, meaning that the bus switch 13 connects the two data segments 11, 12 with one another according to FIG. 1. The recording material can be turned by means of a turning device 20 in the region between the two printing units 2, 3, such that the front side of the recording material is printed by the one printing unit 2 and the back side of the recording material is printed by the other printing unit 3. However, the recording material can also be printed twice without being turned, for example with two different colors.

FIG. 4 shows the printing system in an operating mode in which the two printing units 2, 3 are operated separately, meaning that an input roller 5 and an output roller 6 are respectively associated with each printing unit 2, 3 so that the recording materials are printed either only by the one printing unit 2 or only by the other printing unit 3.

In the printing system according to the exemplary embodiment, this operating mode can simply be switched centrally by the central control device 15. Given such a "switching", the data switches 17 of the bus switch 13 are either open or closed.

Although a preferred exemplary embodiment is shown and described in detail in the drawings and in the preceding specification, it should be viewed as purely exemplary and not as limiting the invention. It is noted that only a preferred exemplary embodiment is shown and described, and all variations and modifications that presently or in the future lie within the protective scope of the invention should be protected.

We claim as our invention:

1. A printing system, comprising:
   at least two printing units to apply printing ink onto a recording material, wherein each printing unit has multiple apparatuses with a respective microprocessor controller;
   the microprocessor controllers of the respective printing units being connected with one another via a respective data bus segment and wherein each data bus segment has multiple data lines;
   the at least two data bus segments of the two printing units are connected with a bus switch, the bus switch for each data line respectively having a data switch to connect a respective one of the lines of the one data bus segment with the corresponding line of the other data bus segment, and a respective terminating resistor for each data bus segment; and
   the terminating resistors being connected in series with a respective terminating switch, the terminating switches being coupled with the data switches such that either all terminating switches are open and all data switches are closed, or all terminating switches are closed and all data switches are open.

2. The printing system according to claim 1 wherein each of the data bus segments is a serial data bus, and is operated with a CAN protocol or an HCSX protocol.

3. The printing system according to claim 1 wherein the data switches and the terminating switches are designed as relays.

4. The printing system according to claim 1 wherein the printing system has a central control device that activates the data switches and the terminating switches to open and close them.

5. The printing system according to claim 4 wherein the central control device is connected with the microprocessor controllers, and the central control device configures all microprocessor controllers connected with the data bus segments upon activation of the printing system and/or upon switching the bus switch.

6. The printing system according to claim 5 wherein given separate data bus segments, the microprocessor controller of one of the data bus segments is respectively initialized as a master by the central control device before a booting of the microprocessor controllers, and given connected data bus segments only a single microprocessor controller is initialized as the master.

7. The printing system according to claim 4 wherein the apparatuses are drive apparatuses to move at least one recording material.

8. The printing system according to claim 1 wherein the central control device is connected with the microprocessors with a separate bus system.

9. A method to operating a printing system, comprising the steps of:
provproviding at least two printing units to apply printing ink onto a recording material, wherein each printing unit has multiple apparatuses with a respective microprocessor controller;
providing the microprocessor controllers of the respective printing units connected with one another via a respective data bus segment and wherein each data bus segment has multiple data lines;
providing the at least two data bus segments of the two printing units connected with a bus switch, the bus switch for each data line respectively having a data switch to connect a respective one of the lines of the one data bus segment with the corresponding line of the other data bus segment, and a respective terminating resistor for each data bus segment;
providing the terminating resistors connected in series with a respective terminating switch, the terminating switch being coupled with the data switches such that either all terminating switches are open and all data switches are closed, or all terminating switches are closed and all data switches are open; and
given separated data bus segments operating the data bus segments as separate data buses, and given connected data bus segments operating the data bus segments jointly as one data bus.

10. The method according to claim 9 wherein in the data bus or in the data buses, a speed with which a recording material is conveyed in the printing system is respectively predetermined by the microprocessor controller connected with the respective data bus.

* * * * *